United States Patent
Kumar et al.

(10) Patent No.: US 11,449,007 B2
(45) Date of Patent: Sep. 20, 2022

(54) WEARABLE DEVICE WITH BEZEL RING TO ENABLE MOTION IN MULTIPLE DEGREES OF FREEDOM

(71) Applicant: Samsung Electronics Co., Ltd., Suwon-si (KR)

(72) Inventors: Kapil Kumar, Bangalore (IN); Arindam Mondal, Bangalore (IN); Gaurav Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1031 days.

(21) Appl. No.: 16/137,245

(22) Filed: Sep. 20, 2018

(65) Prior Publication Data

US 2019/0113889 A1    Apr. 18, 2019

(30) Foreign Application Priority Data

Sep. 20, 2017   (IN) .............................. 201741033327
Jul. 5, 2018    (IN) ............................ 2017 41033327

(51) Int. Cl.
*G04B 19/28* (2006.01)
*G04B 37/00* (2006.01)
(Continued)

(52) U.S. Cl.
CPC ........... *G04B 19/283* (2013.01); *G04B 27/08* (2013.01); *G04B 37/0008* (2013.01); *G06F 1/163* (2013.01); *G06F 3/0338* (2013.01); *G06F 3/0362* (2013.01); *G06F 3/0481* (2013.01); *G06F 3/0482* (2013.01); *G06F 3/0485* (2013.01); *G06F 3/04845* (2013.01); *G06F 2203/04806* (2013.01)

(58) Field of Classification Search
CPC ..... G04B 19/283; G04B 27/08; G04B 37/008
See application file for complete search history.

(56) References Cited

U.S. PATENT DOCUMENTS 6,556,222 B1    4/2003   Narayanaswami
6,799,886 B2   10/2004   Carrard et al.
(Continued)

OTHER PUBLICATIONS

International Search Report regarding International Application No. PCT/KR2018/011016, dated Jan. 8, 2019, 3 pages.
(Continued)

*Primary Examiner* — Edwin A. Leon
*Assistant Examiner* — Jason M Collins

(57) ABSTRACT

A wearable device and a method for performing one or more actions using a wearable device are disclosed. The wearable device includes a bezel ring, a watch dial a flexible ring, and a plurality of springs. The bezel ring includes a plurality of holes along a circumference of the bezel ring for placement of a plurality of magnets. The watch dial includes an outer periphery with another plurality of holes at a uniform distance. The watch dial also includes an inner periphery to house inertial sensors at a predetermined position. The flexible ring placed in between an inner surface of the bezel ring and the watch dial. A plurality of springs are placed within the other plurality of holes of the outer periphery of the watch dial. The bezel ring is configured to support at least one of tilting, shifting and rotation over the watch dial.

7 Claims, 20 Drawing Sheets

(51) Int. Cl.
  *G04B 27/08*    (2006.01)
  *G06F 3/0362*   (2013.01)
  *G06F 1/16*     (2006.01)
  *G06F 3/0485*   (2022.01)
  *G06F 3/0481*   (2022.01)
  *G06F 3/04845*  (2022.01)
  *G06F 3/0338*   (2013.01)
  *G06F 3/0482*   (2013.01)

(56)　　　　　References Cited

U.S. PATENT DOCUMENTS

| | | |
|---|---|---|
| 9,778,760 B1 | 10/2017 | Huang et al. |
| 2003/0206493 A1 | 11/2003 | Carrard et al. |
| 2006/0139320 A1 | 6/2006 | Lang |
| 2012/0120776 A1* | 5/2012 | Fleury ............... G04B 19/12 368/205 |
| 2014/0139422 A1* | 5/2014 | Mistry ............... G06F 3/014 345/156 |
| 2016/0202665 A1 | 7/2016 | Park |
| 2016/0252979 A1 | 9/2016 | Fun et al. |
| 2016/0255733 A1* | 9/2016 | Jung ............... G06F 1/163 361/759 |
| 2016/0327915 A1* | 11/2016 | Katzer ............... G04C 3/002 |
| 2016/0379604 A1* | 12/2016 | Komulainen ......... G06F 3/0488 345/184 |
| 2017/0093451 A1 | 3/2017 | Chen et al. |

OTHER PUBLICATIONS

Supplementary European Search Report in connection with European Application No. 18857734.0 dated Jul. 24, 2020, 8 pages.

* cited by examiner

Patch with large area  Patch with Small area

WEARABLE DEVICE WITH BEZEL RING TO ENABLE MOTION IN MULTIPLE DEGREES OF FREEDOM

CROSS-REFERENCE TO RELATED APPLICATIONS

This application is based on and claims priority under 35 U.S.C. § 119(a) to Indian Provisional Patent Application No. 201741033327, filed on Sep. 20, 2017, and to Indian Non-Provisional Patent Application No. 201741033327, filed on Jul. 5, 2018, in the Indian Patent Office, the disclosure of which is incorporated by reference herein in its entirety.

BACKGROUND

In general, wearable computing devices are electronic devices that may be worn by an individual on a body part. Examples of wearable computing devices include, but are not limited to, smart watches, wristbands or the like.

The wearable devices are equipped with smaller display screens which makes it difficult to provide input events. For example, a user cannot navigate in a web page very easily or play a game on the wearable device which requires many input events. The existing solutions utilize inertial sensors like Accelerometer, Gyroscope and so on for user interaction. However, with these solutions, the user has to move his/her wrist, which occludes the display screen of the wearable device. Various other solutions allow touchless interaction with the wearable device through sensors by monitoring hand gestures around the wearable device.

In some existing systems, the wearable device is presented with a rotating bezel which offers a new navigation mechanism that complements the drawbacks of a touch based user interface. With introduction of rotating bezel, the number of touch gestures required to navigate through a list can be reduced by a single continuous rotate action of the bezel.

Although, the rotating bezel provides an additional level convenience for user interaction with the wearable device, the bezel can be utilized to perform various functions and/or actions on the wearable device based on various movements of the bezel other than rotation of the bezel.

The above information is presented as background information only to help the reader to understand the present disclosure. Applicants have made no determination and make no assertion as to whether any of the above might be applicable as Prior Art with regard to the present application.

SUMMARY

The principal object of the embodiments herein is to provide a wearable device with a bezel ring to enable motion in multiple degrees of freedom.

Another object of the embodiments herein is to provide a bezel ring with a plurality of holes at a uniform distance along a circumference of the bezel ring for placement of a plurality of magnets.

Another object of the embodiments herein is to provide a watch dial with an outer periphery having a plurality of holes at a uniform distance for placement of a plurality of springs.

Another object of the embodiments herein is to provide a flexible ring placed in between an inner surface of the bezel ring and the watch dial.

Another object of the embodiments herein is to provide a plurality of springs within the plurality of holes of the outer periphery of the watch dial.

Another object of the embodiments herein is to provide a bezel ring adapted to support at least one of tilting, shifting and rotation over the watch dial.

Another object of the embodiments herein is to provide a bezel ring which is adapted to support tilting along a vertical axis and the tilt can be achieved at any angle.

Another object of the embodiments herein is to provide a bezel ring which is adapted to support shift along a horizontal axis and the shift can be achieved at any angle.

Another object of the embodiments herein is to detect an angle of tilting and translating the bezel in any direction (i.e., horizontal or vertical or degree of tilt/shift).

Another object of the embodiments herein is to eliminate the effect of earth's magnetic field by updating the baseline field in the model.

Accordingly the embodiments herein provide a wearable device with a bezel ring to enable motion in multiple degrees of freedom. The wearable device includes a bezel ring with a plurality of holes at a uniform distance along a circumference of the bezel ring for placement of a plurality of magnets. The wearable device includes a watch dial with an outer periphery having a plurality of holes at a uniform distance for placement of a plurality of springs and an inner periphery to house inertial sensors at a pre-determined position. The wearable device includes a flexible ring placed in between an inner surface of the bezel ring and the watch dial and the plurality of springs are placed within the plurality of holes of the outer periphery of the watch dial. The bezel ring is adapted to support at least one of tilting, shifting and rotation over the watch dial.

Accordingly the embodiments herein provide a wearable device. The wearable device includes a bezel ring with a plurality of holes at a uniform distance along a circumference of the bezel ring for placement of a plurality of magnets. The wearable device includes a watch dial with an outer periphery having a plurality of holes at a uniform distance for placement of a plurality of springs and an inner periphery to house inertial sensors at a pre-determined position. The wearable device includes a flexible ring placed in between an inner surface of the bezel ring and the watch dial. The bezel ring is adapted to support at least one of shifting and rotation over the watch dial.

Accordingly the embodiments herein provide a wearable device. The wearable device includes a bezel ring with a plurality of holes at a uniform distance along a circumference of the bezel ring for placement of a plurality of magnets. The wearable device includes a watch dial with an outer periphery having a plurality of holes at a uniform distance for placement of a plurality of springs and an inner periphery to house inertial sensors at a pre-determined position. The plurality of springs are placed within the plurality of holes of the outer periphery of the watch dial. The bezel ring is adapted to support at least one of tilting and rotation over the watch dial.

Accordingly the embodiments herein provide a wearable device. The wearable device includes a bezel ring with a plurality of magnets and a watch dial with inertial sensors. The bezel ring is adapted to support at least one of tilting, shifting and rotation over the watch dial.

Accordingly the embodiments herein provide a method for performing one or more actions using a wearable device. The method includes detecting a change in magnetic field through the inertial sensors in response to the input received on the bezel ring. The method includes determining that the change in magnetic field is greater than a pre-defined threshold value. The method includes identifying the input received on the bezel ring in response to determining that the change in the magnetic field is greater than the threshold value. Further, the method includes performing the one or more actions on the wearable device in accordance with the input.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
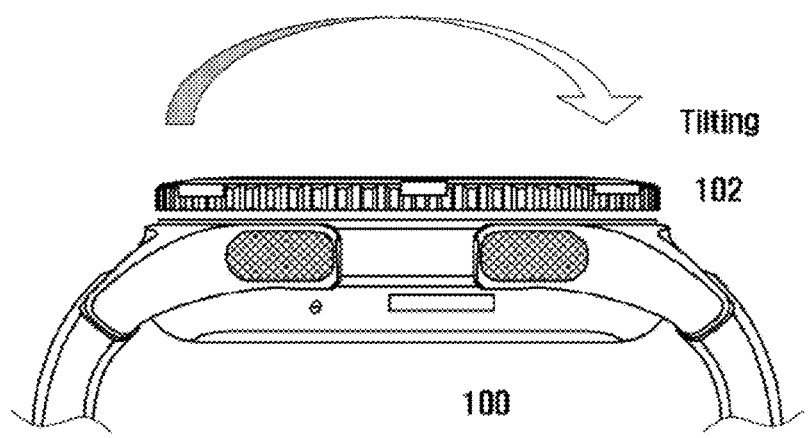
FIGS. 1A-1C illustrate a wearable device with a bezel ring adapted to support tilting, shifting and rotation, according to embodiments as disclosed herein.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a wearable device with a bezel ring to enable motion in multiple degrees of freedom. The wearable device includes a bezel ring with a plurality of holes at a uniform distance along a circumference of the bezel ring for placement of a plurality of magnets. The wearable device includes a watch dial with an outer periphery having a plurality of holes at a uniform distance for placement of a plurality of springs and an inner periphery to house inertial sensors at a pre-determined position. The wearable device includes a flexible ring placed in between an inner surface of the bezel ring and the watch dial and the plurality of springs are placed within the plurality of holes of the outer periphery of the watch dial. The bezel ring is adapted to support at least one of tilting, shifting and rotation over the watch dial.

In an embodiment, the bezel ring surrounds the watch dial with a pre-determined gap between the bezel ring and the watch dial to enable tilting and shifting of the bezel ring over the watch dial.

In an embodiment, the bezel ring is mounted over the watch dial with a pre-determined gap between the bezel ring and the watch dial.

In an embodiment, the plurality of springs on the outer periphery of the watch dial enables tilting of the bezel ring over the watch dial.

In an embodiment, the flexible ring placed in between the bezel ring and the watch dial enables the bezel ring to shift over the watch dial.

In an embodiment, the inertial sensors placed on the inner periphery of the watch dial detect a change in magnetic field based on movement of the plurality of magnets in the bezel ring during at least one of tilting and shifting of the bezel ring over the watch dial.

In an embodiment, a plurality of sensors are placed along the inner periphery of the watch dial to detect a change in a capacitance based on a movement of the bezel ring during at least one of tilting and shifting of the bezel ring over the watch dial.

The proposed wearable device allows the bezel ring to enable motion in multiple degrees of freedom. The design of the circular bezel ring enables the multiple degrees of freedom which includes tilting, shifting and rotation. It should be noted that the bezel can be tilted, shifted and rotated over the watch dial and based on titling, shifting and rotation, one or more actions are performed on the wearable device. Thus, the proposed wearable device with the bezel ring allows the user to interact with the wearable device by performing tilting, shifting and rotation of the bezel ring to provide one or more inputs to the wearable device. The wearable device performs one or more actions in accordance with the one or more inputs (i.e., tilting, shifting and rotation) on the bezel ring.

The bezel ring can be tilted or shifted over the watch dial in any direction (i.e., horizontal or vertical or degree of tilt/shift). The bezel ring can be shifted and rotated simultaneously over the watch dial. Further, the bezel ring can be tilted and rotated simultaneously.

In various embodiments, a change in magnetic field due to the movement of permanent magnets in the bezel ring is detected by the inertial sensors housed in the inner periphery of the watch dial. In an example, the bezel ring is embedded with eight magnets at 45 degree interval. The change in the magnetic field is detected by the two inertial sensors (i.e., magnetometers placed within the watch dial. With a single magnetometer, similar functionalities can be obtained but the system requires stronger magnet which is not feasible on the wearable device. Thus, two magnetometers are placed closer to the bezel to improve the detection accuracy. The magnetometer output contains the ambient magnetic field of the earth which changes based on the orientation of the device. The baseline value is updated when the device is not undergoing any bezel event. For detection of the change in magnetic field, the relative change from the baseline value is used as a feature to identify events on the bezel ring.

In various embodiments, the wearable device is equipped with capacitive sensors over the watch dial. This design is based on the principle of detecting the change in the capacitance based on movement of the bezel ring. The bezel ring includes patches of conductive strips on its bottom side to detect tilting. The watch dial has as an arrangement of electrodes around it to detect shifting.

The bezel ring will be floating on the top edge of the watch with the help of compression springs on the bottom. The uniform distribution of the eight (8) compression springs allows the bezel ring to tilt in any direction. The flexible ring (for example, a Delrin ring) placed in between the bezel ring and watch dial allows shifting and tilting of the bezel. Each spring supports a ball that creates the detent effect required for rotate motion. Each spring includes a spherical ball which will be in contact with the bottom surface of the bezel ring. Further, the bezel ring has 24 oblong grooves at regular intervals on the bottom side, to create the detent feedback when rotating.

In an embodiment, the spherical ball allows a frictionless movement while rotating the bezel ring and it also limits the bezel ring from freely rotating. The groves on the bottom side of the bezel ring are in oval shape to allow horizontal shifting of the bezel ring.

Referring now to the drawings and more particularly to FIGS. 1 through 16, where similar reference characters denote corresponding features consistently throughout the figures, there are shown preferred embodiments.

Figure 1B:
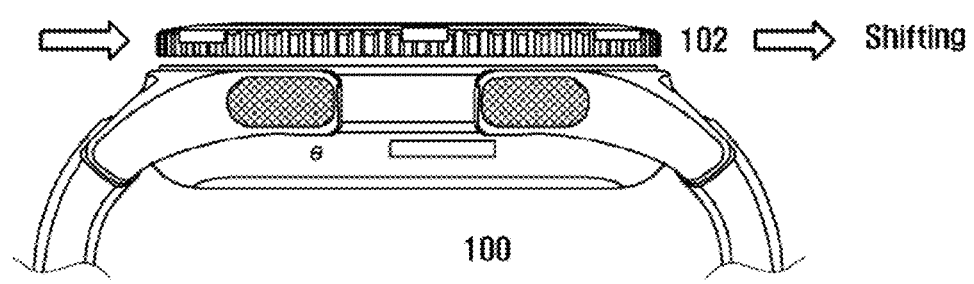
Figure 1C:
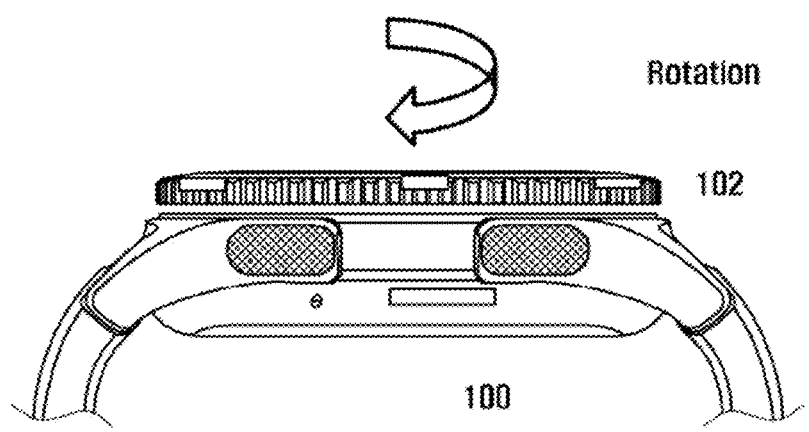

FIGS. 1A-1C illustrate a wearable device 100 with a bezel ring 102 adapted to support tilting, shifting and rotation, according to embodiments as disclosed herein.

In an embodiment, the bezel ring 102 is adapted to support tilting over the watch dial as shown in the FIG. 1A.

In another embodiment, the bezel ring 102 is adapted to support shift over the watch dial as shown in the FIG. 1B.

In yet another embodiment, the bezel ring is adapted to support rotation over the watch dial as shown in the FIG. 1C.

Although it is shown in the FIGS. 1A-1C, tilting, shifting and rotation are shown independently, it should be noted that the bezel ring 102 is adapted to support tilting, shifting and rotation simultaneously over the watch dial, which allows the user to interact with the wearable device 100 by tilting, shifting and rotation for performing one or more actions on the wearable device 100. The design of the bezel ring 102 to support tilting, shifting and rotation over the watch dial is explained in conjunction with various figures.

Figure 2A:
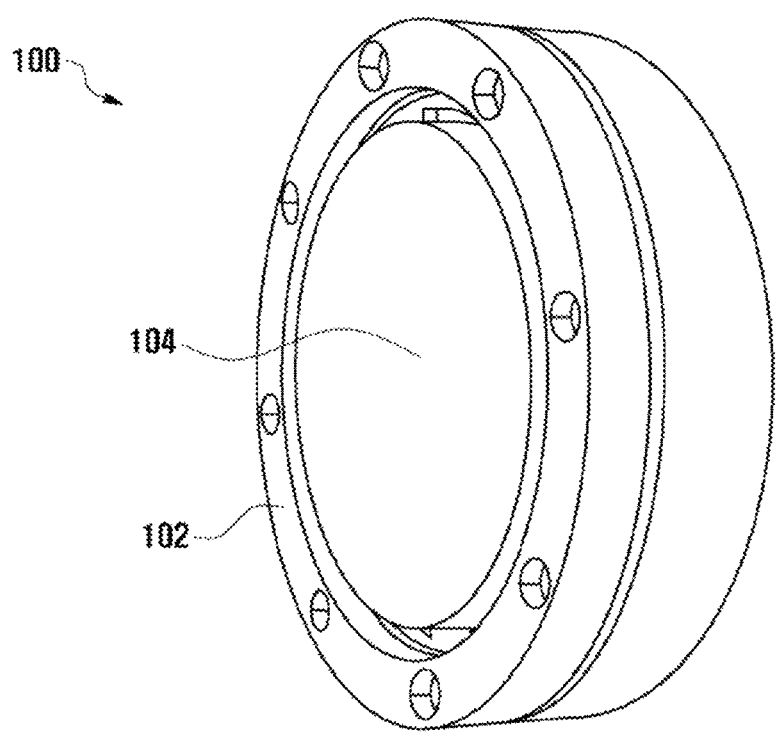
FIG. 2A illustrates a wearable device with the bezel ring having a plurality of holes and mounted over a watch dial, according to an embodiment as disclosed herein.

FIG. 2A illustrates a wearable device 100 with the bezel ring 102 with a plurality of holes mounted over a watch dial 104, according to an embodiment as disclosed herein. As depicted in the FIG. 2A, the bezel ring 102 is mounted over the watch dial 104 with a pre-determined gap between the bezel ring 102 and the watch dial 104. For example, the pre-determined gap is 0.5 mm. Further, the bezel ring 102 surrounds the watch dial with a pre-determined gap between the bezel ring 102 and the watch dial 104 to enable tilting and shifting of the bezel ring 102 over the watch dial 104. The bezel ring 102 includes a plurality of holes at a uniform distance along a circumference of the bezel ring for placement of a plurality of magnets as shown in the FIG. 2A.

Figure 2B:
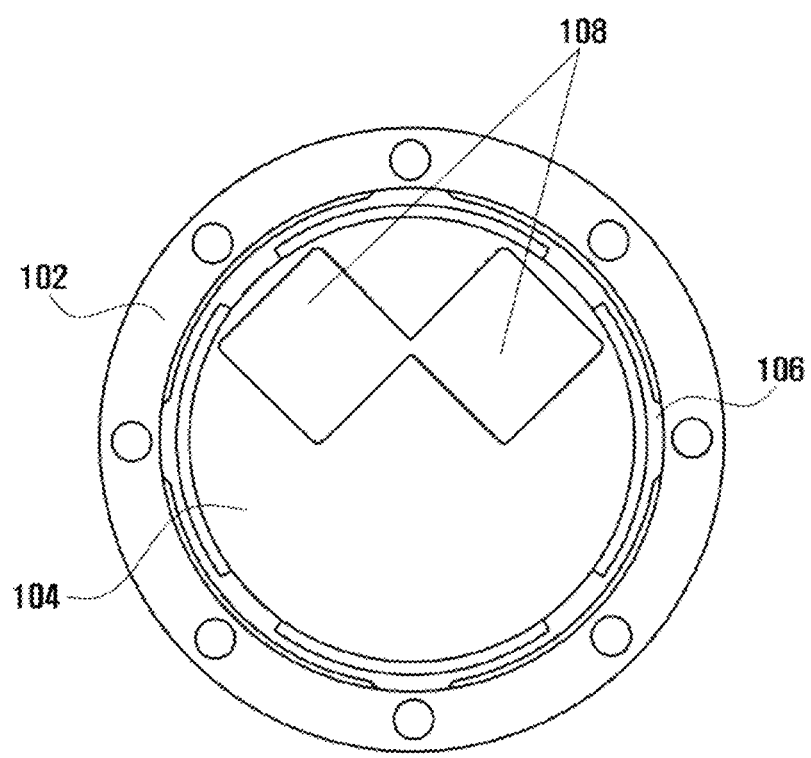
FIG. 2B illustrates a watch dial of the wearable device with a housing for inertial sensors, according to embodiments as disclosed herein.

FIG. 2B illustrates a watch dial 104 of the wearable device 100 with a housing for inertial sensors 108, according to embodiments as disclosed herein. As depicted in the FIG. 2B, the watch dial 104 includes an inertial sensors 108 placed at a fixed or pre-determined position. These inertial sensors 108 are magnetometers which are used to detect the change in magnetic field which is caused due to the movement (i.e., shifting, tilting and/or rotation) of the bezel ring 102 over the watch dial 104. A flexible ring 106 (which is a Delrin ring is placed between the bezel ring 102 and the watch dial 104 as shown in the FIG. 2A. The flexible ring 106 placed in between the bezel ring 102 and the watch dial 104 enables the bezel ring 102 to shift over the watch dial 104. A view of the flexible ring is shown in the FIG. 6.

Figure 3A:
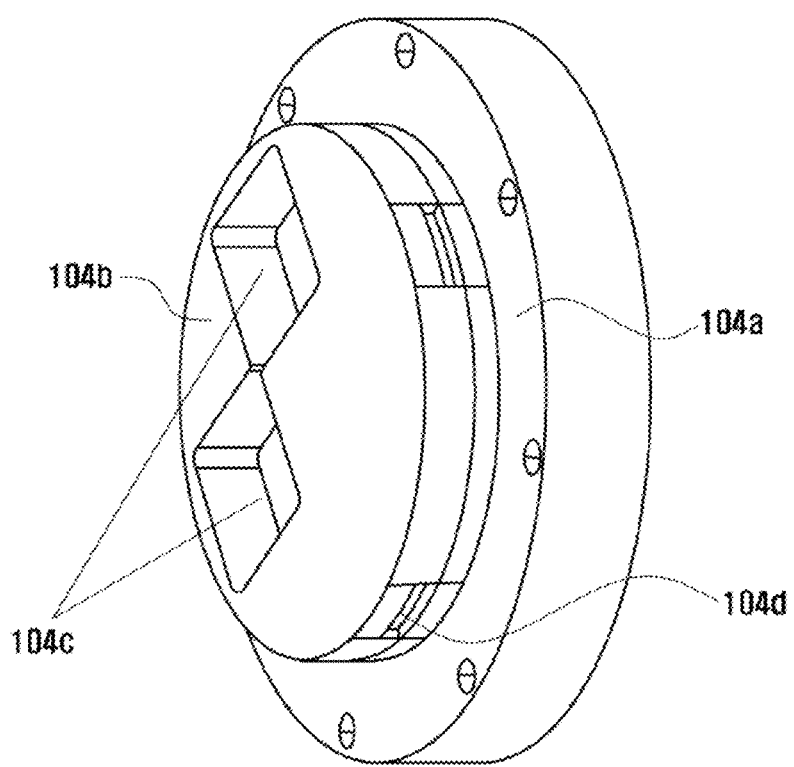
FIG. 3A illustrates a perspective view of the watch dial with an outer periphery and an inner periphery, according to an embodiment as disclosed herein.

FIG. 3A illustrates a perspective view of the watch dial 104 with an outer periphery and an inner periphery, according to an embodiment as disclosed herein. As depicted in the FIG. 3A, the watch dial 104 includes an outer periphery 104a and inner periphery 104b.

In an embodiment, the outer periphery 104a includes a plurality of holes at a uniform distance for placement of a plurality of springs.

In an embodiment, the inner periphery 104b houses inertial sensors at a fixed or pre-determined positions 104c as shown in the FIG. 3A.

The flexible ring 106 is engaged into the watch dial 104 at 104d as shown in the FIG. 3A.

Figure 3B:
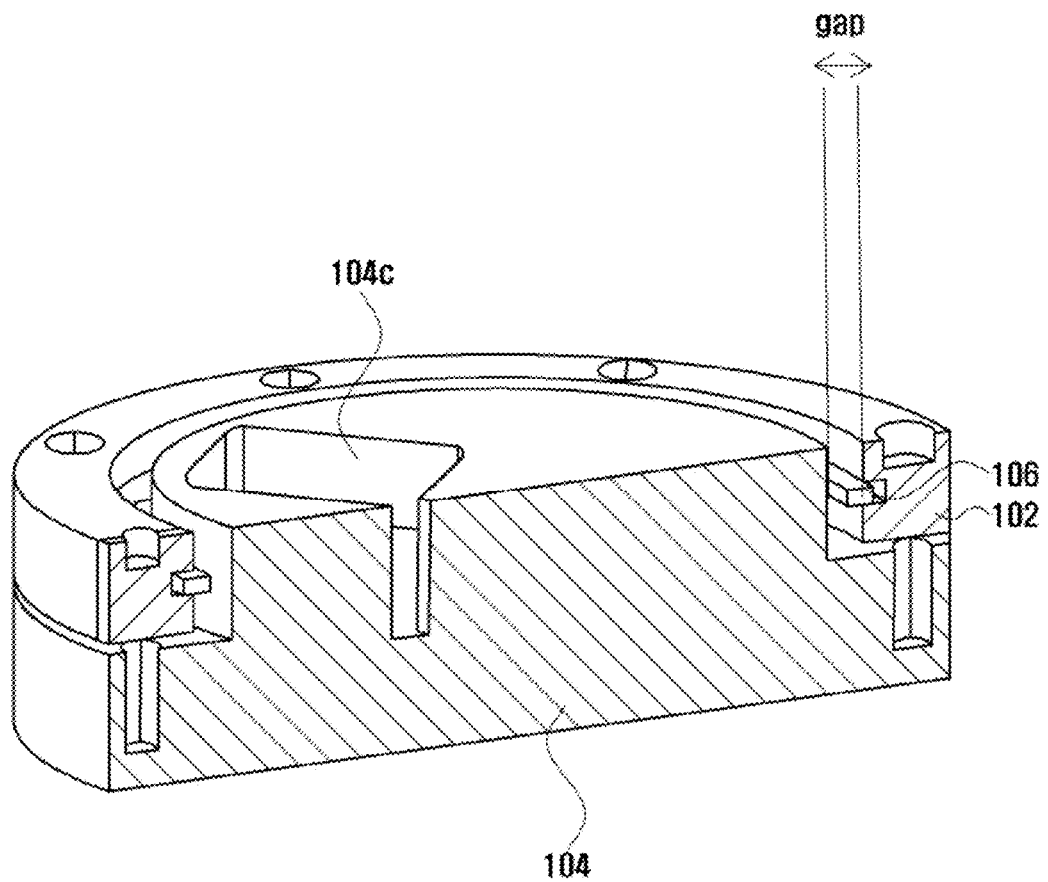
FIG. 3B illustrates a cross sectional view of the wearable device with the bezel ring over the watch dial, according to an embodiment as disclosed herein.

FIG. 3B illustrates a cross sectional view of the wearable device 100 with the bezel ring 102 over the watch dial 104, according to an embodiment as disclosed herein. The bezel ring 102 is mounted over the watch dial 104 with a fixed or a pre-determined gap (for example 5 mm) between the bezel ring 102 and the watch dial 104 as shown in the FIG. 3B. The gap between the bezel ring 102 and the watch dial 104 to enable tilting of the bezel ring 102 over the watch dial 104.

Figure 4:
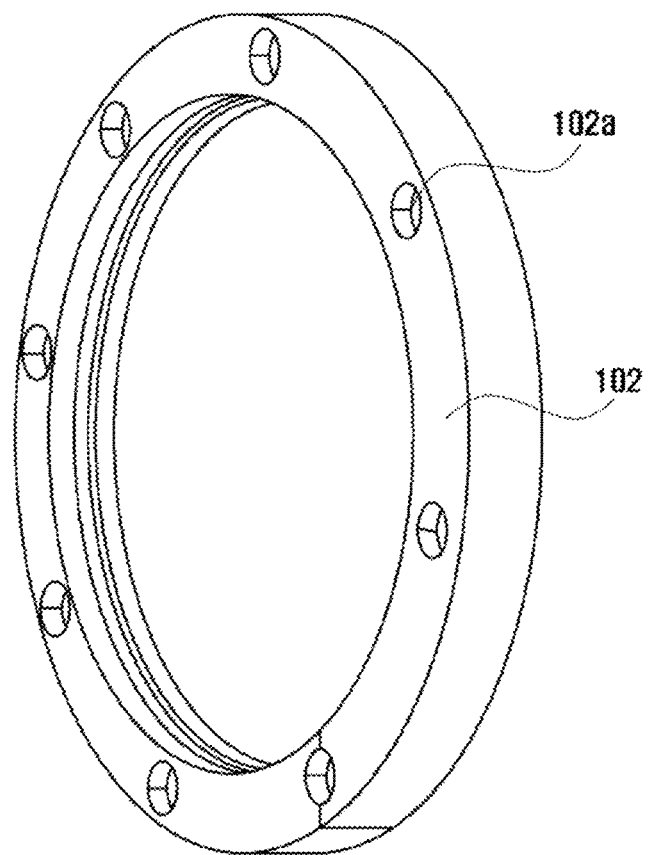
FIG. 4 illustrates the bezel ring with the plurality of holes, according to an embodiment as disclosed herein.

FIG. 4 illustrates the bezel ring 102 with the plurality of holes, according to an embodiment as disclosed herein. As depicted in the FIG. 4, the bezel ring 102 includes holes 102a at a uniform distance along the circumference of the bezel ring 102 for placement magnets. The bezel ring 102 is embedded with 8 magnets in eight holes at a 45 degree interval.

Figure 5:
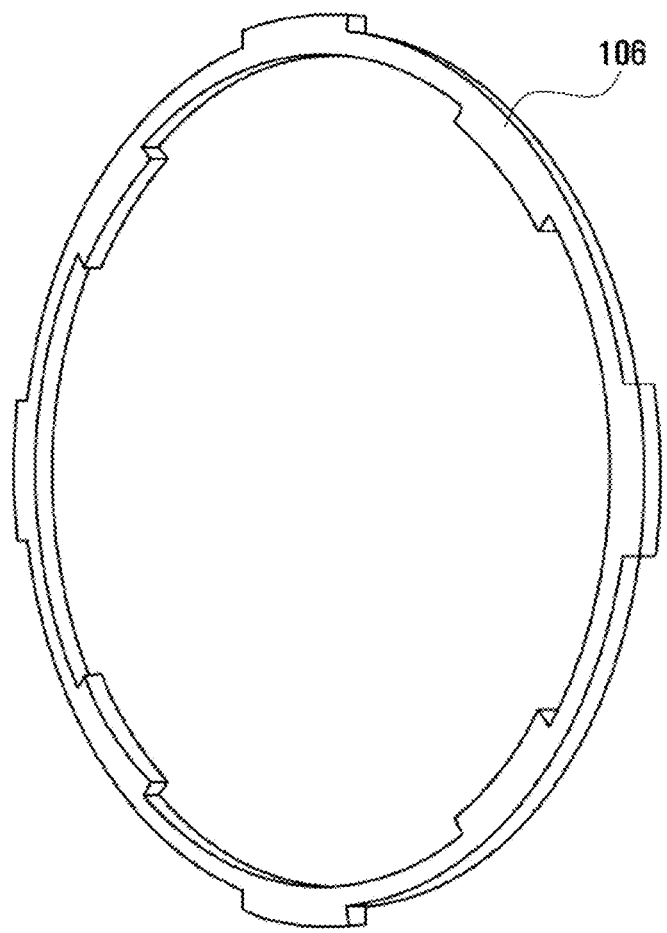
FIG. 5 illustrates a view of a flexible ring, according to an embodiment as disclosed herein.

FIG. 5 illustrates a view of a flexible ring 106, according to an embodiment as disclosed herein. The flexible ring 106 is a plastic ring such as a Delrin ring. The flexible ring 106a has a circular shape with raised edges along the circumference for shifting of the bezel ring 102 over the watch dial 104. The raised edges of the bezel ring 102 along the circumference enables the bezel ring to switch back to an initial state after shifting of the bezel ring 102 over the watch dial 104.

Figure 6:
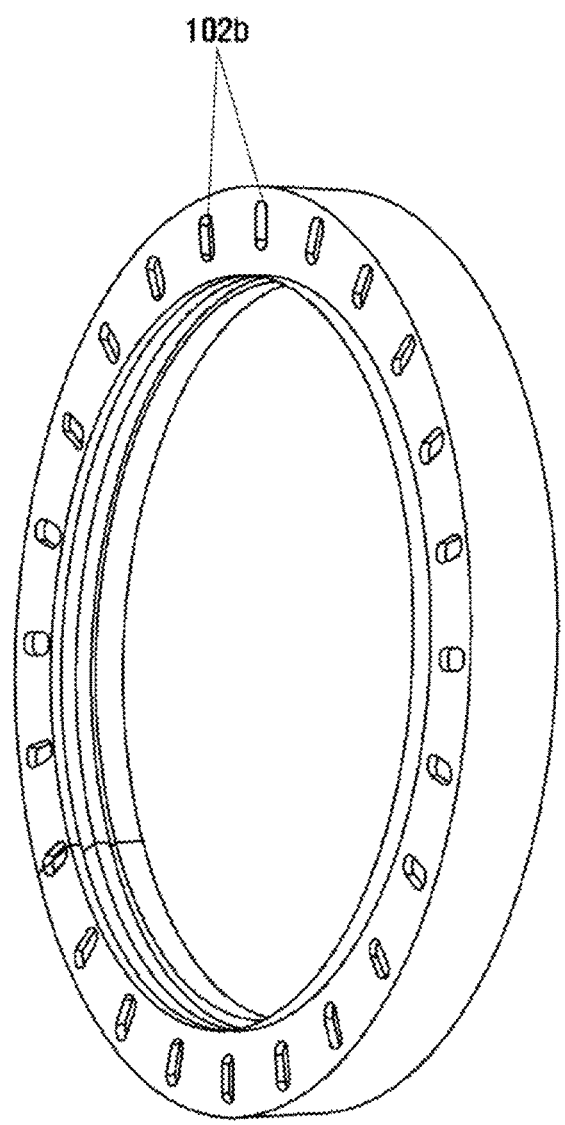
FIG. 6 illustrates another perspective view of the bezel ring, according to an embodiment as disclosed herein.

FIG. 6 illustrates another perspective view of the bezel ring 102, according to an embodiment as disclosed herein. The FIG. 6 shows a bottom surface of the bezel ring 102.

In an embodiment, the bezel ring 102 includes 24 oblong grooves at regular intervals on the bottom side as shown in the FIG. 6, to create the detent feedback when rotating the bezel ring over the watch dial 104. Further, the flexible ring 106 (as shown in the FIG. 5) engages in the inner surface of the bezel ring 102 as shown in the FIG. 6.

Figure 7:
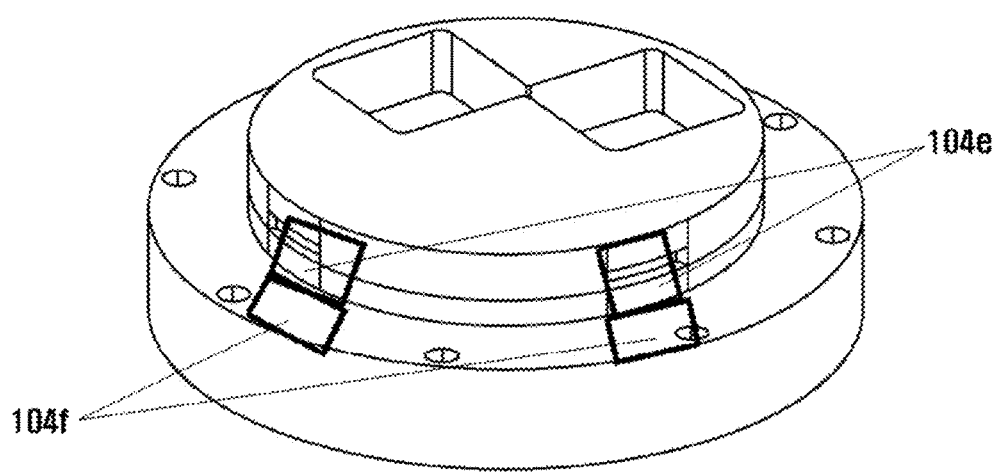
FIG. 7 illustrates an arrangement of electrodes on the watch dial, according to an embodiment as disclosed herein.

FIG. 7 illustrates an arrangement of electrodes on the watch dial, according to an embodiment as disclosed herein. As depicted in the FIG. 7, the inner periphery 104b of the watch dial 104 includes vertical electrodes 104e for shifting of the bezel ring 102 and horizontal electrodes 104f for tilting of the bezel ring 102 over the watch dial 104.

Figure 8:
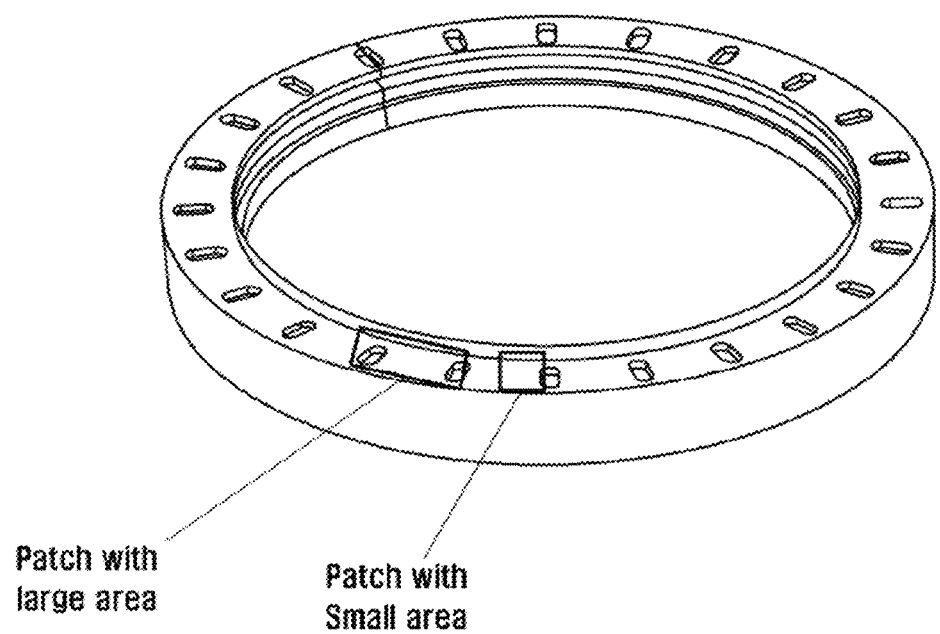
FIG. 8 illustrates an arrangement of conductive patch on the bezel ring, according to an embodiment as disclosed herein.

FIG. 8 illustrates an arrangement of conductive patch on the bezel ring, according to an embodiment as disclosed herein. As depicted in the FIG. 8, the bottom surface of the bezel ring 102 includes patches of conductive strips on its bottom surface to detect tilting of the bezel ring over the watch dial 104. A change in capacitance is detected based on the movement of the bezel ring 102 during at least one of tilting and shifting of the bezel ring 102 over the watch dial 104.

Figure 9:
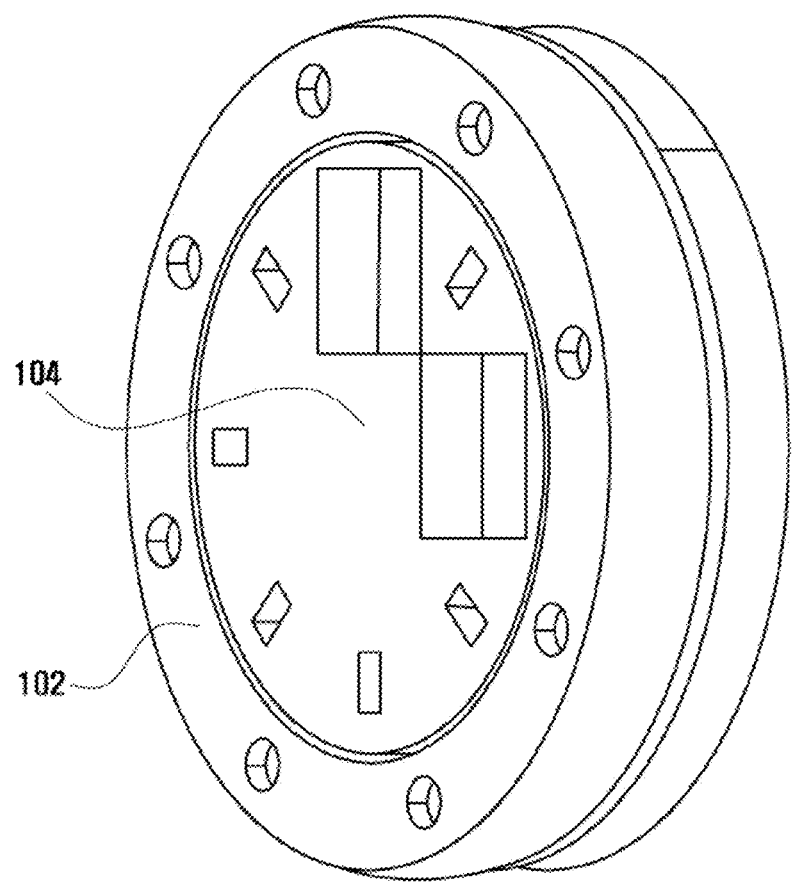
FIG. 9 illustrates another perspective view of the bezel ring mounted over the watch dial, according to an embodiment as disclosed herein.

FIG. 9 illustrates another perspective view of the bezel ring 102 mounted over the watch dial 104, according to an embodiment as disclosed herein. The bezel ring 102 with plurality of holes is mounted over the watch dial 104 which houses the inertial sensors (i.e., magnetometers) as shown in the FIG. 9.

Figure 10:
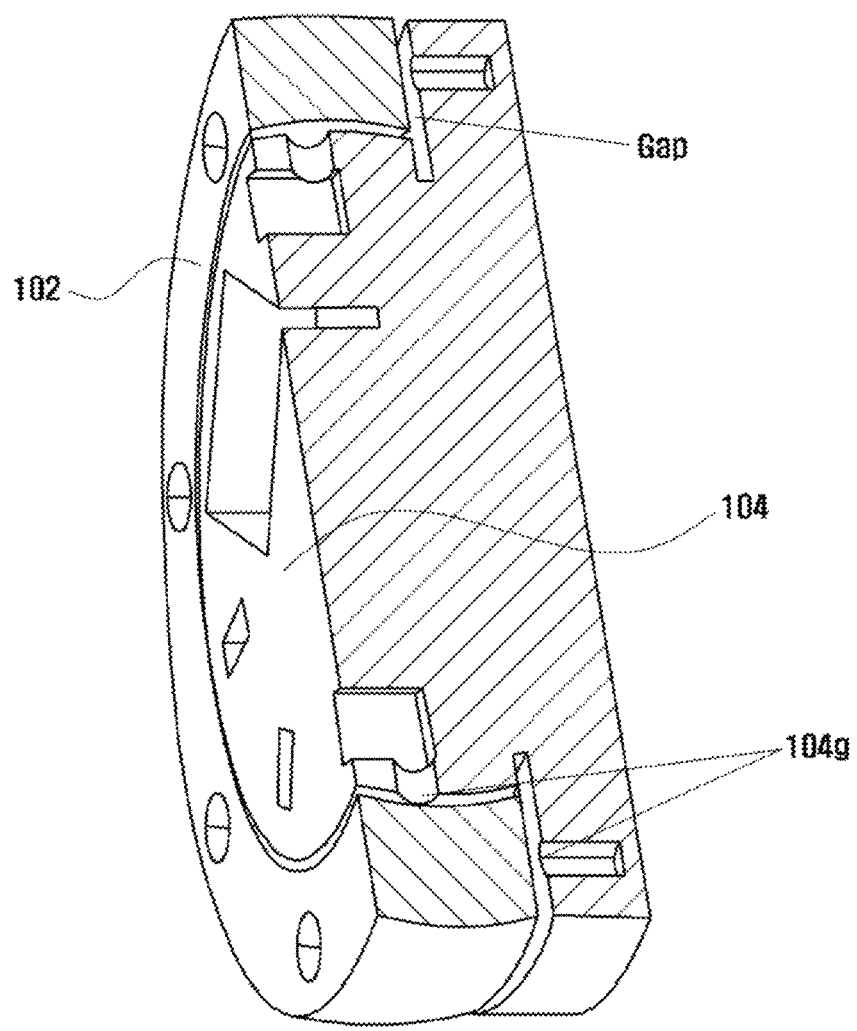
FIG. 10 illustrates a cross sectional view of the wearable device in which a plurality compression springs are placed for tilting and shifting of the bezel ring, according to an embodiment as disclosed herein.

FIG. 10 illustrates a cross sectional view of the wearable device 100 in which a plurality compression springs are placed for tilting and shifting of the bezel ring, according to an embodiment as disclosed herein. As depicted in the FIG. 10, the bezel ring is mounted over the watch dial with a gap. The compression springs are placed at positions 104g as shown in the FIG. 10. The compression springs positioned at 104g enables the rotation and tilting of the bezel ring 102 over the watch dial 104.

Figure 11:
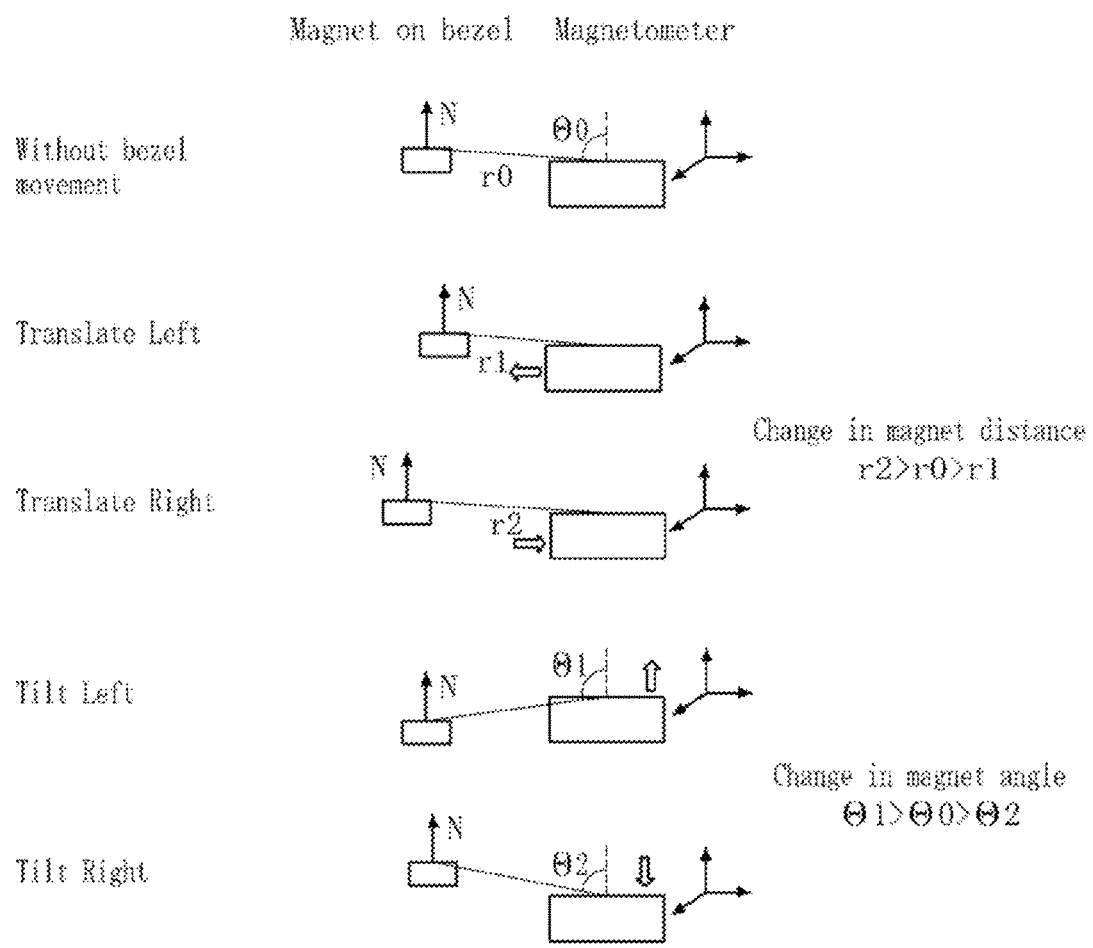
FIG. 11 illustrates a variation in magnetic field due to movements of the bezel ring over the watch dial, according to an embodiment as disclosed herein.

FIG. 11 illustrates a variation in magnetic field due to movements of the bezel ring 102 over the watch dial 104, according to an embodiment as disclosed herein. As depicted in the FIG. 11, when there is no movement of the bezel ring, the distance between a magnet on the bezel ring 102 to the magnetometer on the watch dial 104 is r0 and an angle between the bezel ring 102 and the watch dial 104 is Θ0. When the bezel ring 102 is shifted left, the distance between a magnet on the bezel ring 102 to the magnetometer on the watch dial 104 is r1 (i.e., r0>r1). Further, when the bezel ring 102 is shifted right, the distance between a magnet on the bezel ring 102 to the magnetometer on the watch dial 104 is r2 (i.e., r2>r0>r1).

When the bezel ring 102 is tilted either left or right, the angle Θ0 changes to Θ1 and Θ2 respectively (i.e., Θ1>Θ0>Θ2)

Thus, due to the shifting and/or tilting of the bezel ring over the watch dial 104, there is a change in magnetic field due to the variation of distance due to shifting and angular variation due to tilting. The magnetometers detect the change in magnetic field due to the shifting and/or tilting of the bezel ring 102 over the watch dial 104. The magnetometer output contains the ambient magnetic field of the earth which changes based on the orientation of the wearable device 100. In an embodiment, the baseline value is updated when the wearable device 100 device is not undergoing any event on the bezel ring 102. For detection of the change in magnetic field, the relative change from the baseline value is used as a feature to identify events (tilting, shifting and rotation) on the bezel ring 102.

Figure 12:
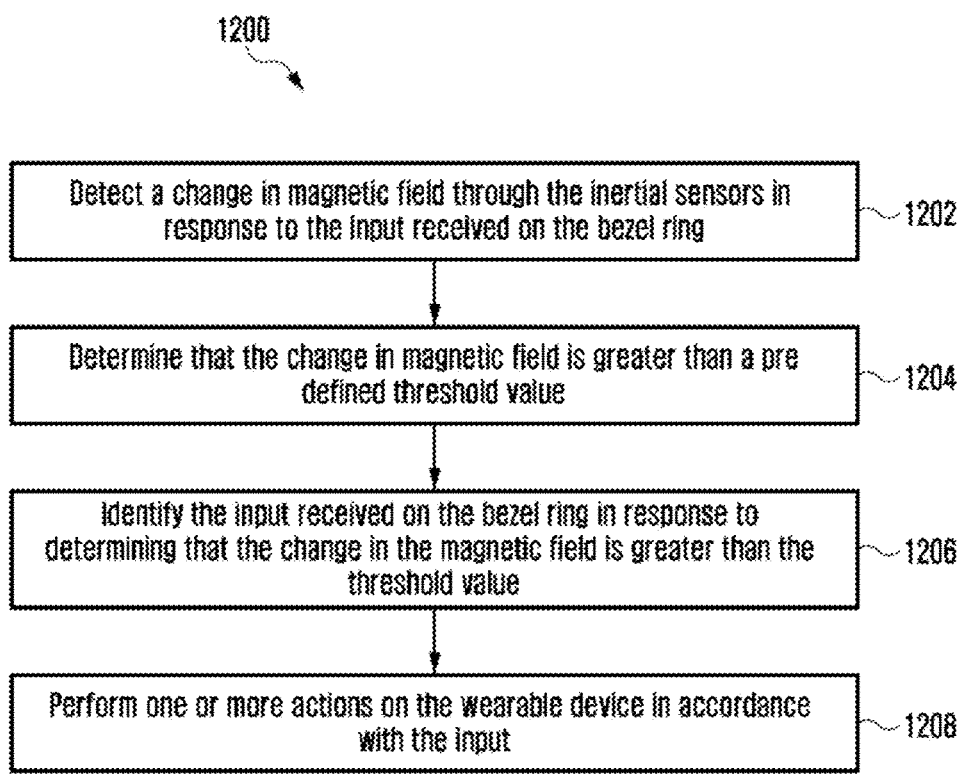
FIG. 12 is a flow chart illustrating a method for performing actions using the wearable device, according to an embodiment as disclosed herein.

FIG. 12 is a flow chart 1200 illustrating a method for performing actions using the wearable device 100, according to an embodiment as disclosed herein.

Prior to detecting a change in magnetic field, the change of magnetic field due to earth magnet is dynamically handled at the wearable device 100.

At step 1202, the method includes detecting a change in magnetic field through the inertial sensors in response to the input received on the bezel ring 102. The inertial sensors (i.e., the magnetometers) positioned on the inner periphery 104b of the watch dial 104 detect the change in magnetic field based on the input received on the bezel ring 102.

At step 1204, the method includes determining that the change in magnetic field is greater than a pre-defined threshold value. The change in magnetic field is compared with a threshold value to determine whether the change in magnetic field is greater than the threshold value.

In an embodiment, the threshold value is dynamically changed in response to ambient magnetic field.

At step 1206, the method includes identifying the input received on the bezel ring in response to determining that the change in the magnetic field is greater than the threshold value. When there is a change in magnetic field, the relative change from the baseline value of the magnetic field is used as a feature to identify the input events (tilting, shifting and rotation) on the bezel ring 102. As the magnetometer measurement is affected by the earth's magnetic field, the baseline value is continuously updated unless there is a change that corresponds to the action on the bezel ring 102. The resetting of the baseline also ensures that the system works for different orientations of the user's arm.

At step 1208, the method includes performing one or more actions on the wearable device 100 in accordance with the input. The wearable device 100 performs various actions tilting, shifting and rotation) on the bezel ring 102.

The proposed design of the bezel ring 102 can be used for performing various actions on the wearable device 100. For e.g. controlling core application on the watch, flying drone and so on. The Table 1 shows an example mapping of the input events on the bezel ring 102 with respect to an action inside the application running on the wearable device 100 or a connected device to the wearable device 100.

TABLE 1

| User Input | Generic Action |
|---|---|
| Touch | Shoot/Touch action |
| Rotation | Zoom in and Zoom out/ Navigation or Scrolling in list of items |
| Tilt Left | Move the view to the left as if the player is looking left/ Panning left/Moving cursor left |
| Tilt Right | Move the view to the left as if the player is looking right/ Panning right/Moving cursor right |
| Tilt Up | Scrolling up/Panning up/ Moving cursor up |
| Tilt Down | Scrolling down/Panning down/Moving cursor down |
| Shift Right | Back/Cancel |
| Shift Left | Select |
| Shift Up | Notification bar/Menu |
| Shift Down | Custom action |
| Bezel Click | Go back to the Home screen |

Some of the example illustrations which can be achieved with the help of proposed bezel ring design are as described herein.

Figure 13:
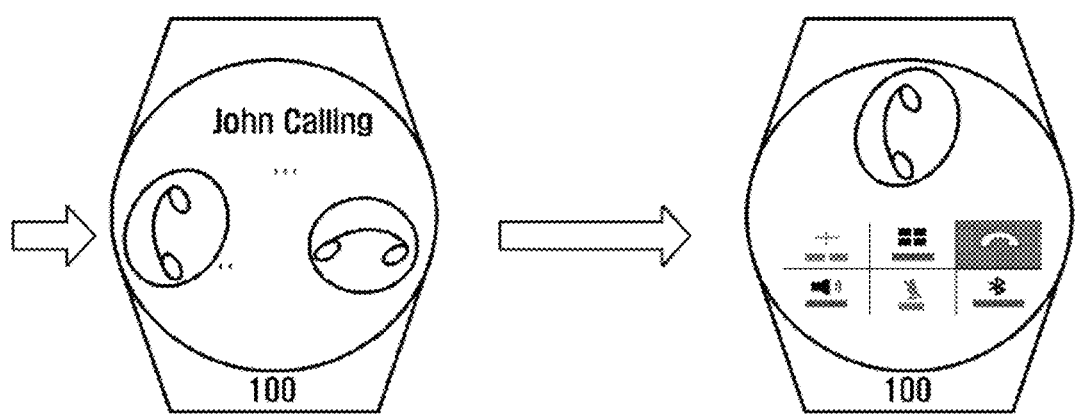
FIG. 13 is an example illustration in which the bezel ring is shifted to accept a phone call, according to an embodiment as disclosed herein.

FIG. 13 is an example illustration in which the bezel ring is shifted to accept a phone call, according to an embodiment as disclosed herein. As depicted in the FIG. 13, the user can accept or reject call using by translating the bezel from left to right or right to left. The call can be muted by translating the bezel ring 102 from top to bottom or reply with a SMS by translating the bezel ring from bottom to top.

Figure 14:
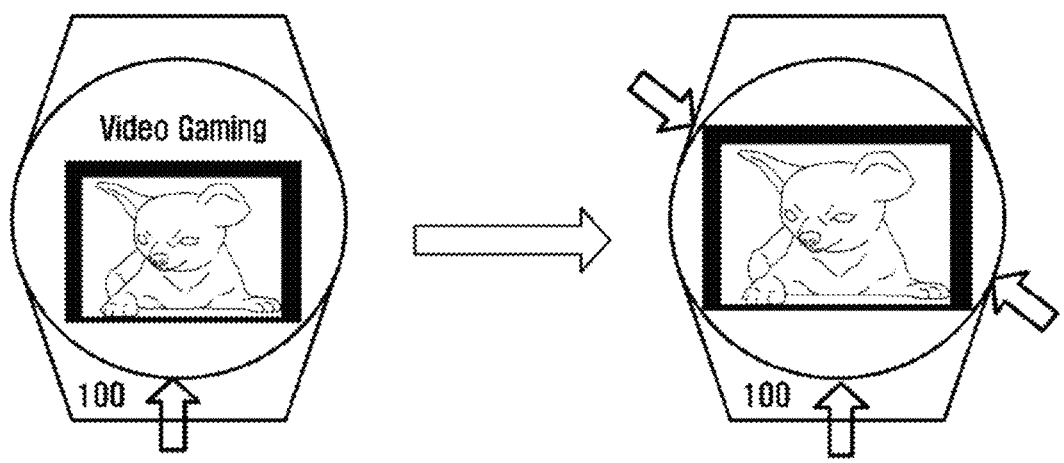
FIG. 14 is an example illustration in which a video game is controlled through the bezel ring, according to embodiments as disclosed herein.

FIG. 14 is an example illustration in which a video game is controlled through the bezel ring, according to embodiments as disclosed herein. The bezel ring 102 can be used as a joystick to play games on the wearable device 100. The bezel ring 102 can control the player with tilt events to jump, bend down, move left or right. In some examples, the user can rotate the bezel ring 102 to zoom in or out. The bezel ring 102 can be shifted for performing various actions like changing weapon, opening menu or the like.

Figure 15:
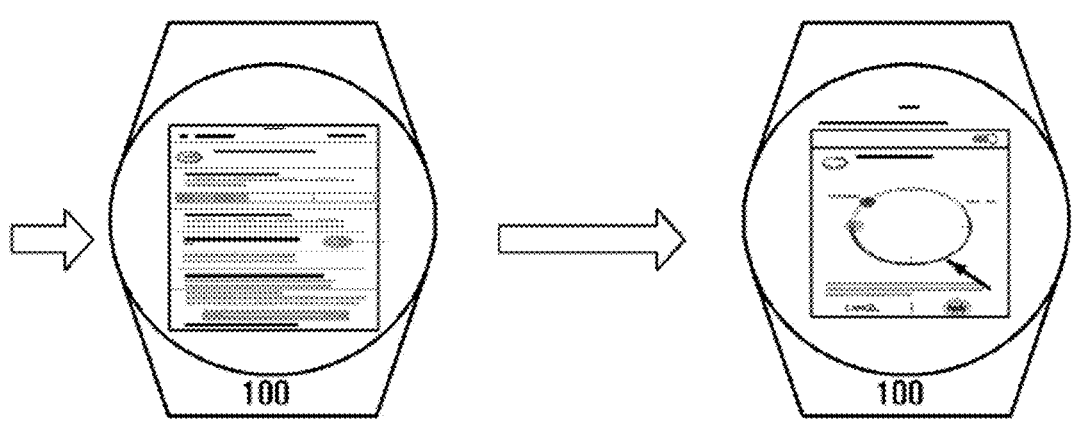
FIG. 15 is example illustration to control a cursor in the web browser application through the bezel ring, according to embodiments as disclosed herein.

FIG. 15 is example illustration to control a cursor in the web browser application through the bezel ring, according to embodiments as disclosed herein. The application such as web browser can use the bezel events along with the cursor pointers for easy navigation and control of the application. As shown in the FIG. 15, the cursor can be moved around by tilting the bezel ring 102. In some scenarios, the bezel ring 102 can be shifted left and right which acts similar to a mouse left and right click.

Figure 16:
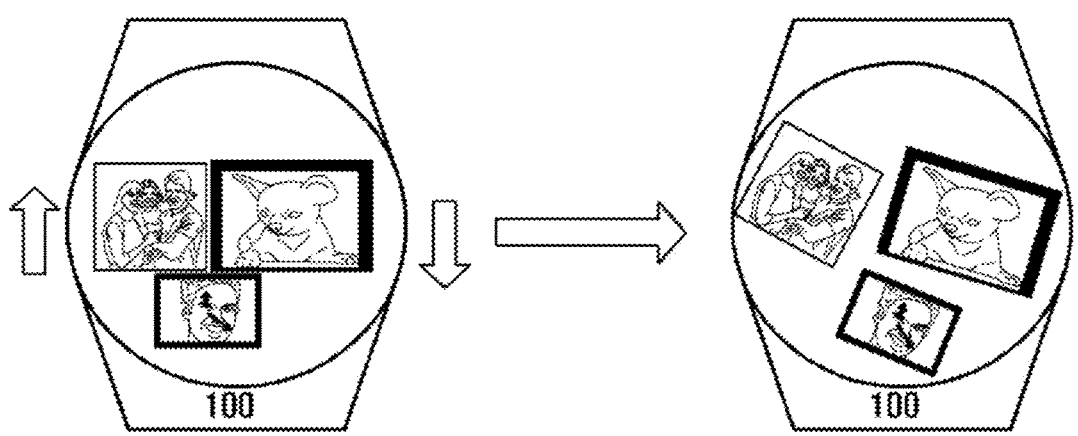
FIG. 16 is an example illustration to interact with a gallery application through the bezel ring, according to embodiments as disclosed herein.

FIG. 16 is an example illustration to interact with a gallery application through the bezel ring, according to embodiments as disclosed herein. Applications such as Gallery can utilize the bezel events to provide more attractive user experience. As shown in the FIG. 16, the bezel ring 102 can be tilted to view the 3D effects in the images. Once tilting of the bezel ring crosses a threshold, then next set of images are displayed.

The embodiments disclosed herein can be implemented through at least one software program running on at least one hardware device and performing network management functions to control the elements. The elements shown in FIGS. 1 through 16 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A wearable device, comprising:
   a bezel ring including a plurality of holes along a circumference of the bezel ring for placement of a plurality of magnets;
   a watch dial including:
      an outer periphery including another plurality of holes, and
      an inner periphery to house inertial sensors at a predetermined position;
   a flexible ring placed in between an inner surface of the bezel ring and the watch dial to enable the bezel ring to shift in a first direction over the watch dial; and
   a plurality of springs placed within the other plurality of holes of the outer periphery of the watch dial such that the plurality of springs contact a bottom surface of the bezel ring,
   wherein the plurality of springs on the outer periphery enable tilting of the bezel ring in a second direction perpendicular to the first direction over the watch dial, and
   wherein the bezel ring is configured to simultaneously support tilting and shifting using the springs and the flexible ring.

2. The wearable device claim 1, wherein the bezel ring surrounds the inner periphery of the watch dial with a predetermined gap between the bezel ring and the inner periphery of the watch dial to enable tilting and shifting of the bezel ring over the watch dial.

3. The wearable device claim 1, wherein the bezel ring is mounted over the outer periphery of the watch dial with a predetermined gap between the bezel ring and the watch dial.

4. The wearable device of claim 1, wherein the flexible ring placed in between the bezel ring and the inner periphery of the watch dial is configured to enable the bezel ring to shift over the watch dial.

5. The wearable device of claim 1, wherein the inertial sensors placed on the inner periphery of the watch dial and are configured to detect a change in a magnetic field based on a movement of the plurality of magnets in the bezel ring during at least one of tilting and shifting of the bezel ring over the watch dial.

6. The wearable device of claim 5, wherein the inertial sensors are magnetometers.

7. The wearable device of claim 1, wherein the inertial sensors are placed along the inner periphery of the watch dial and are configured to detect a change in a capacitance based on a movement of the bezel ring during at least one of tilting and shifting of the bezel ring over the watch dial.

* * * * *